US007778921B2

(12) United States Patent
Carlos et al.

(10) Patent No.: US 7,778,921 B2
(45) Date of Patent: *Aug. 17, 2010

(54) GUARANTEED NEGOTIATION SYSTEM AND METHOD

(75) Inventors: Fides Carlos, Livingston, NJ (US); Glenn D. J. Ransier, Middletown, NJ (US); Farhad Subjally, Chatham, NJ (US); Shankar Subramaniam, Frankfurt (DE); Imran Yusuf, Piscataway, NJ (US)

(73) Assignee: Standard Chartered (CT) PLC, London, England (GB)

( * ) Notice: Subject to any disclaimer, the term of this patent is extended or adjusted under 35 U.S.C. 154(b) by 17 days.

This patent is subject to a terminal disclaimer.

(21) Appl. No.: 12/326,779

(22) Filed: Dec. 2, 2008

(65) Prior Publication Data

US 2009/0083193 A1 Mar. 26, 2009

Related U.S. Application Data

(63) Continuation of application No. 10/707,313, filed on Dec. 4, 2003, now Pat. No. 7,475,037.

(60) Provisional application No. 60/480,267, filed on Jun. 19, 2003.

(51) Int. Cl.
*G06Q 40/00* (2006.01)
(52) U.S. Cl. .......................................... 705/38; 705/35
(58) Field of Classification Search ................... 705/35, 705/37, 40, 38
See application file for complete search history.

(56) References Cited

U.S. PATENT DOCUMENTS

| 5,611,052 | A | 3/1997 | Dykstra et al. |
|---|---|---|---|
| 5,704,045 | A | 12/1997 | King et al. |
| 5,717,989 | A | 2/1998 | Tozzoli et al. |
| 5,890,140 | A | 3/1999 | Clark et al. |
| 6,141,653 | A | 10/2000 | Conklin et al. |
| 6,151,588 | A | 11/2000 | Tozzoli et al. |
| 6,332,135 | B1 | 12/2001 | Conklin et al. |
| 6,336,105 | B1 | 1/2002 | Conklin et al. |
| 6,338,050 | B1 | 1/2002 | Conklin et al. |
| 6,353,812 | B2 | 3/2002 | Frankel et al. |
| 2002/0103754 | A1 | 8/2002 | Dunlop |
| 2002/0116327 | A1 | 8/2002 | Srinivasan |
| 2002/0138415 | A1 | 9/2002 | Siska |
| 2003/0014353 | A1 | 1/2003 | Fitzherbert |
| 2003/0033259 | A1 | 2/2003 | Walker et al. |

(Continued)

OTHER PUBLICATIONS

PR Newswire. Provident Bank Provides On-lin Letters of Credit Through Technology Platform Designed by EC- Finance. NY: Dec. 5, 2000. p. 1.*

(Continued)

*Primary Examiner*—Lalita M Hamilton
(74) *Attorney, Agent, or Firm*—Snell & Wilmer L.L.P.

(57) ABSTRACT

A system and method for facilitating the negotiation of credits. The bank issuing the credit and a nominated bank agree to program conditions pursuant to which the nominated bank, based upon its own examination of documents presented under the credit and before said documents are forwarded to, received, and accepted by the issuing bank, will pay, accept, or negotiate the credit with no or limited recourse to the issuing bank for discrepancies in the documents.

15 Claims, 4 Drawing Sheets

U.S. PATENT DOCUMENTS

| | | |
|---|---|---|
| 2003/0105713 A1 | 6/2003 | Greenwald et al. |
| 2003/0115129 A1 | 6/2003 | Feaver et al. |
| 2003/0140005 A1 | 7/2003 | Cole |
| 2004/0088245 A1 | 5/2004 | Narayan et al. |

OTHER PUBLICATIONS

Garrett, Panchita. "Money in or Out? Measuring the Impact of Foregin Banking Agencies in Texas". Texas Banking. Austin: Apr. 1994. vol. 83, Issue 4, p. 5, 2 pgs.*

Krishnmurthy, V."India: Documentary Letters of Credit". Businessline. Chennai: Nov. 12, 2001. p. 1.*

Krishnmurthy, V. "India: Documentary Letters of Credit". Businessline. Chennai: Nov. 12, 2001. p. 1.

PR Newswire. Provident Bank Provides On-Line Letters of Credit Through Technology Platform Designed by EC-Finance. NY: Dec. 5, 2000. p. 1.

Garrett, Panchita. "Money in or Out? Measuring the Impact of Foreign Banking Agencies in Texas". Texas Banking. Austin: Apr. 1004. vol. 83, Issue 4, p. 5, 2 pgs.

USPTO; Non-Final Office Action; U.S. Appl. No. 10/707,313; dated Nov. 24, 2004.

USPTO; Non-Final Office Action; U.S. Appl. No. 10/707,313; dated May 5, 2005.

USPTO; Final Office Action; U.S. Appl. No. 10/707,313; dated Aug. 12, 2005.

USPTO; Advisory Action; U.S. Appl. No. 10/707,313; dated Feb. 6, 2006.

USPTO; Non-Final Office Action; U.S. Appl. No. 10/707,313; dated Oct. 25, 2006.

USPTO; Final Office Action; U.S. Appl. No. 10/707,313; dated Apr. 4, 2007.

USPTO; Advisory Action; U.S. Appl. No. 10/707,313; dated Jun. 11, 2007.

USPTO; Non-Final Office Action; U.S. Appl. No. 10/707,313; dated Sep. 4, 2007.

USPTO; Non-Final Office Action; U.S. Appl. No. 10/707,313; dated Feb. 28, 2007.

USPTO; Notice of Allowance; U.S. Appl. No. 10/707,313; dated Nov. 4, 2008.

* cited by examiner

US 7,778,921 B2

GUARANTEED NEGOTIATION SYSTEM AND METHOD

RELATED APPLICATIONS

This application is a continuation of, claims priority to and the benefit of U.S. Ser. No. 10/707,313, filed Dec. 4, 2003 and entitled "GUARANTEED NEGOTIATION SYSTEM AND METHOD". The '313 application claims priority to, and the benefit of, U.S. provisional application Ser. No. 60/480,267, filed Jun. 19, 2003. All of which are hereby incorporated by reference.

FIELD OF THE INVENTION

This invention generally relates to letters of credit, and more particularly, a system and method of facilitating the negotiation of documentary letters of credit.

BACKGROUND OF THE INVENTION

Payment options in trade transactions include, for example, letters of credit, pre-payment, sale on open account, documentary collection or draft, and consignment sale. The documentary letter of credit ("Credit") is a widely used payment instrument in trade transactions, and particularly international trade transactions. A Credit is an undertaking by a person, usually a bank, to pay money upon the presentation of certain documents. It is an arrangement whereby a bank, acting at the request and on the instructions of a customer ("applicant") or on its own behalf, (i) is to make payment to or to the order of a third party ("beneficiary"), (ii) is to accept and pay bills of exchange ("drafts") drawn by the beneficiary, (iii) authorizes another bank to effect such payment, to accept and pay such drafts, or (iv) authorizes another bank to negotiate, against the presentation of stipulated documents under the terms of the Credit.

The parties to a Credit are typically comprised of at least an applicant, an issuing bank, and a beneficiary. The applicant is usually a buyer or importer of goods; the beneficiary is usually a seller or exporter of goods; and the issuing bank is usually a bank or other person that undertakes, as previously described, to pay, accept, or negotiate a Credit against a presentation of documents conforming to the stipulated documents under the Credit. A Credit should state precisely the documents against which payment, acceptance or negotiation is to be made. Credits may be revocable or irrevocable, and may be payable immediately ("at sight") or at a later date (deferred payment, acceptance, or negotiation). Credits are often issued with an expiration date, and documents presented after expiry are usually not honored.

A Credit may authorize another bank, often called a nominated bank, to pay, accept, or negotiate provided that the stipulated documents are presented and that the beneficiary complies with the terms and conditions of the Credit. Credits may be confirmed by another bank, thereby establishing a separate and independent undertaking on the part of the confirming bank to pay, accept, or negotiate against documents which appear on their face to be in conformity with the documents stipulated under the Credit.

Stipulated documents under a Credit typically relate to the transfer of title to goods, and may include at least one of, for example, a bill of lading, a commercial invoice, a draft or bill of exchange, a consular document, an insurance certificate, and/or an inspection certificate. Documents may be electronic records as well as paper records. Payment under a Credit is made upon presentation of stipulated documents, which can be conceptualized as payment upon a constructive delivery of goods rather than on actual physical delivery. In practice, one or more intermediary banks may be involved in a Credit transaction. One such bank, often called an advising bank, may notice or advise the beneficiary of the issuance and terms of the Credit. The same or another intermediary bank may accept drafts and/or documents under the Credit, and forward such drafts and/or documents to the issuing bank or to another bank for payment, acceptance, or negotiation. An intermediary bank authorized to pay, accept, or negotiate is often called a nominated bank. A nominated bank's receipt, examination, and/or forwarding of documents presented under a Credit, however, does not usually make that bank liable to the beneficiary. A nominated bank that pays, accepts, or negotiates a Credit, that is, gives value in good faith for conforming documents presented under a Credit, is sometimes called a paying or negotiating bank and has a claim for reimbursement from the issuing bank despite fraud. Under law and practice, banks receiving drafts and/or documents under a Credit have only a few days to take up (honor) conforming documents or refuse (dishonor) discrepant documents, that is, documents which do not conform to those stipulated in the Credit.

Where multiple intermediary banks handle documents under the Credit, the paying or negotiating bank has a claim for reimbursement from the issuing bank or, where designated in the Credit, the reimbursing bank. The reimbursing bank, where separate from the issuing bank, has a claim for reimbursement from the issuing bank. All such claims for reimbursement are payable upon presentation of conforming documents and compliance with the terms of the Credit. The issuing bank is entitled to payment or reimbursement as provided in the agreement between the issuing bank and the applicant, usually including presentation of conforming documents.

Under the independence principle, the undertakings, obligations, and liabilities between participants in a Credit transaction are separate and independent. That is, the undertakings, obligations, and liabilities between the applicant and the beneficiary are separate from, and not contingent upon or affected by, the validity, binding affect or enforceability of the undertakings, obligations, and liabilities existing between the applicant and the issuing bank, the issuing bank and the beneficiary, the issuing bank and any nominated bank, any nominated bank and the beneficiary, and/or any confirming bank and the beneficiary. The issuing bank's undertaking to pay, accept, or negotiate a Credit is independent of and not subject to claims or defenses by the applicant resulting from its underlying relationship with the beneficiary, and a nominated bank's claim for reimbursement of payments made under a Credit is independent of and not subject to the validity, binding effect, or enforceability of the undertakings between the applicant and the issuing bank or the underlying relationship between the applicant and the beneficiary. Further, under the rule of strict compliance, a beneficiary seeking payment under a Credit must present the exact documents stipulated in the Credit, and the issuing bank must accept only those exact documents.

Because of the potential risk of not receiving reimbursement if a bank pays, accepts, or negotiates a Credit (due to the presented documents subsequently being determined to be discrepant, being presented after the expiry of the Credit, or the insolvency of the participant from whom reimbursement is to be obtained), documents received under a Credit are commonly forwarded by the nominated bank to the issuing bank or any reimbursing bank, by any reimbursing bank to the issuing bank, and ultimately by the issuing bank to the applicant, for examination, acceptance, and payment before the issuing bank or any nominated bank pays, accepts, or negotiates the Credit. This forwarding of documents, sometimes multiplies and may result in a significant delay in payment to the beneficiary. Moreover, each intermediary bank imposes fees associated with its handling of documents, and for payment, acceptance, or negotiation, thereby increasing the costs of the transaction.

FIG. 1 illustrates the flows in a representative transaction for which a Credit is used to facilitate payment. An applicant 10 (usually a buyer or an importer of goods) submits a purchase order 11 to a beneficiary 40 (usually a seller or an exporter of goods). After agreement on the terms of purchase and sale, the applicant 10 makes application 21 to its bank, the issuing bank 20, to open a Credit in favor of the beneficiary 40 for payment under the purchase order 11. The application 21 typically specifies the documents that must be presented by the beneficiary 40 for payment under the Credit.

Upon acceptance of the application 21, the issuing bank 20 issues, or opens, its Credit 31 in favor of the beneficiary 40 and for the account of the applicant 10. The Credit typically includes a face amount in a denominated currency and an expiration date, and includes all instructions to the beneficiary relating to payment, including a description of the stipulated documents which must be presented to obtain payment. Such documents may include a draft drawn on a nominated bank 30 or the issuing bank 20. The Credit may nominate the bank authorized to pay, accept, or negotiate, or may be freely negotiable. Where freely negotiable, the credit may designate a reimbursing bank.

The issuing bank 20 advises the beneficiary 40 of the issuance and terms of the Credit 31, or requests that a bank, namely advising bank 30 having an office where the beneficiary 40 is located, advise 41 the Credit 31. The beneficiary 40 arranges for the shipment of goods 12 under the purchase order 11, and obtains from exporters, freight forwarders, governmental officials, and other persons such documents 42 relating to the goods 12 and their shipment as may be required by the Credit 31. The documents 42 may be tangible records or may be in electronic form.

The beneficiary 40 presents the documents 42 evidencing full compliance with the terms of the Credit 31 to the nominated bank 30. The nominated bank 30 examines the documents 42, and if the documents 42 appear conforming, sends the documents 42 to the issuing bank 20 for review. The issuing bank 20 examines the documents 42, and, if the documents 42 appear conforming, the issuing bank 20 notifies the applicant 10, and may send the documents 42 to the applicant 10 for examination.

The applicant 10 examines the documents 42, and if the documents 42 appear conforming, so notifies the issuing bank 20. The applicant 10 also uses the documents 42 to claim the goods 12. The issuing bank 20 notifies the nominated bank 30 of the issuing bank's 20 acceptance of the documents 42, and authorizes payment, acceptance, or negotiation 43 of the Credit 31. Typically, the issuing bank 20 concurrently obtains payment 23 from the applicant 10, and pays or reimburses 33 the nominated bank 30 for payment, acceptance, or negotiation 43 of the Credit 31. The nominated bank 30 pays, accepts, or negotiates 43 the Credit 31 against the documents 42 upon receipt of authorization from the issuing bank 30 and payment 33.

As illustrated in FIG. 1, each of the undertakings of the applicant 10 and the beneficiary 40, the applicant 10 and the issuing bank 20, the issuing bank 20 and the advising/nominated/negotiating bank 30, and the advising/nominated/negotiating bank 30 and the beneficiary 40 is separate and distinct under the independence principle, and is usually not subject to the validity, binding effect, enforceability, or performance of any other undertaking. Also, the nominated bank has no obligation or liability to the issuing bank to pay, accept, or negotiate the Credit, and except where the nominated bank confirms the Credit, no obligation or liability to the beneficiary to pay, accept, or negotiate the Credit.

Efforts to address issues of cost, certainty, and speed of payment in the processing of Credits and documents presented under Credits have generally focused on online services for the simplification and transmission of Credits and trade documents and electronic payment systems. For example, bolero.net provides a system through which parties can exchange secure trade documents and data via the internet. TradeCard and @GlobalTrade are internet-based systems for completing and financing international trade transactions. SWIFT, an industry-owned cooperative, provides global, secure, standardized messaging services to financial institutions.

Credits are largely governed by national laws. For example, in the U.S., Credits are governed by Art. 5 of the Uniform Commercial Code ("UCC"), as adopted by the various states. Most Credits are also subject to the Uniform Customs and Practice for Documentary Credits, Publication 500 ("UCP"), developed by the International Chamber of Commerce ("ICC"). The UCP is an international body of trade practice, custom, and standards of performance for Credits that is commonly incorporated by agreement of the parties for international and domestic Credits. There are many sources of information concerning law and practice applicable to Credits, including JOHN F. DOLAN, THE LAW OF LETTERS OF CREDIT, COMMERCIAL AND STANDBY CREDITS, REVISED EDITION (1996), and the official commentary to UCC Art. 5. The uniform version of and official commentary to Art. 5, the UCP, and Dolan are incorporated by reference.

SUMMARY OF THE INVENTION

Embodiments of the present invention provide for payment, acceptance, or negotiation of Credits with no or limited recourse to the issuing bank for discrepant documents. The issuing bank and a nominated bank agree on conditions governing a program under which the nominated bank will examine documents presented under a Credit, and pay, accept, or negotiate the Credit based on the nominated bank's own examination of the documents with no or minimal recourse to the issuing bank on any discrepancies. Provided that the program conditions are satisfied or substantially satisfied, the nominated bank may pay, accept, or negotiate the Credit upon its own examination of the documents, before the documents are forwarded to, received, and accepted by, the issuing bank. The right of the nominated bank to reimbursement from the issuing bank for payment, acceptance, or negotiation of the Credit is conditioned upon the conformity of the documents to the stipulated documents under the Credit and to the program conditions.

The present invention benefits the issuing bank by, for example: (i) cost savings, namely the issuing bank does not need to examine documents, thereby saving time and the cost of staff to perform such activity; (ii) time savings, namely the applicant receives documents and notices of discrepant documents more quickly, since it is not necessary for the issuing bank to examine the documents itself in view of the examination of the documents by the nominated bank; (iii) fee savings, namely the beneficiary in most cases presents documents under the Credit to the nominated bank, rather than through another intermediary bank, such as a bank with which the beneficiary has banking relations, thereby reducing the number and amount of bank fees paid; and, (iv) business increase for the issuing bank, principally as a result of faster and less expensive turnaround of documents and payment of Credits.

BRIEF DESCRIPTION OF THE DRAWINGS

The accompanying drawings, wherein like reference numerals represent like elements, are incorporated in and constitute a part of this specification and, together with the description, explain the advantages and principles of the invention. In the drawings.

DETAILED DESCRIPTION

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

Figure 1:
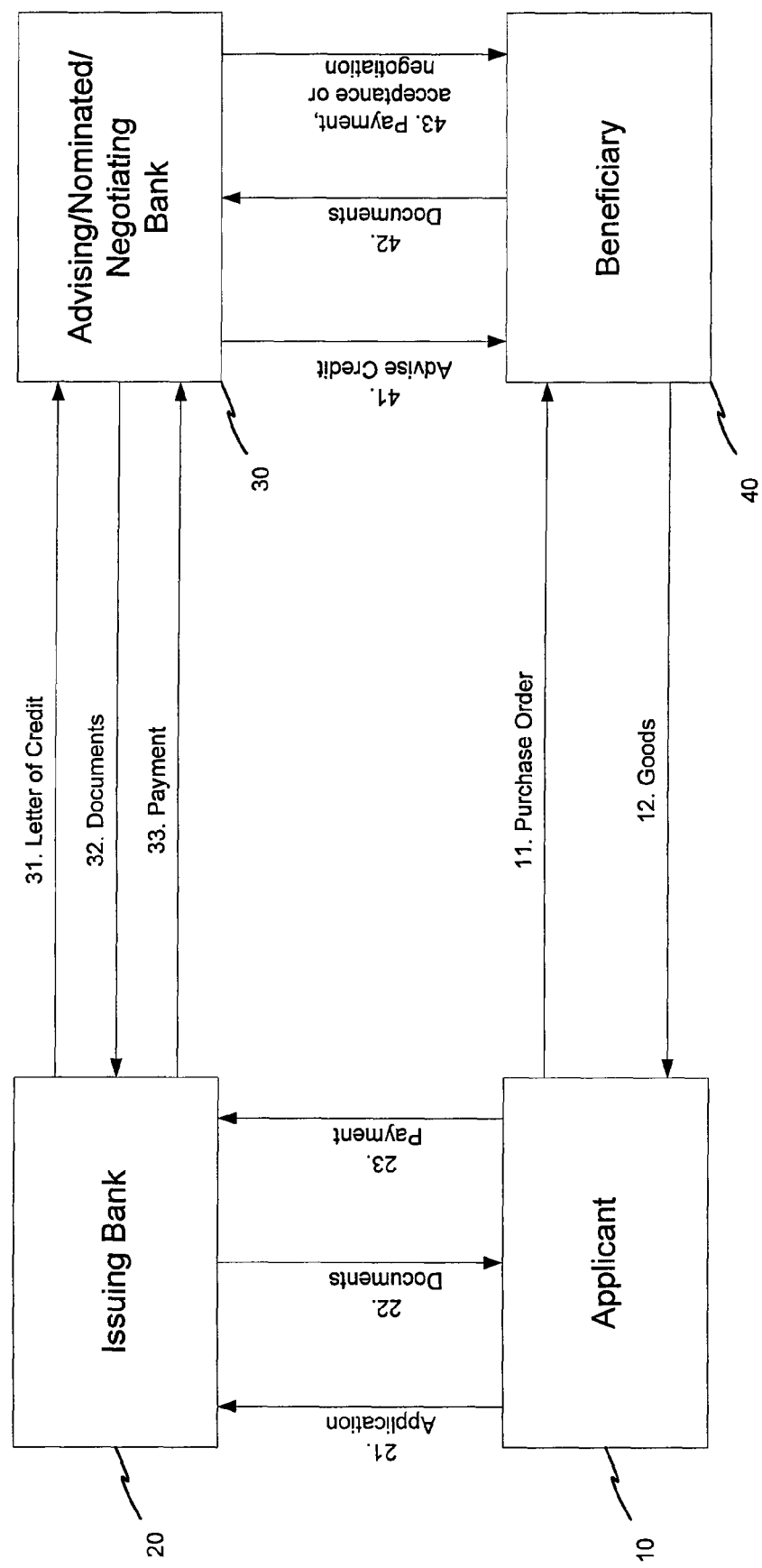
FIG. 1 is a block diagram illustrating exemplary flows in a representative transaction utilizing a Credit for payment.
Figure 2:
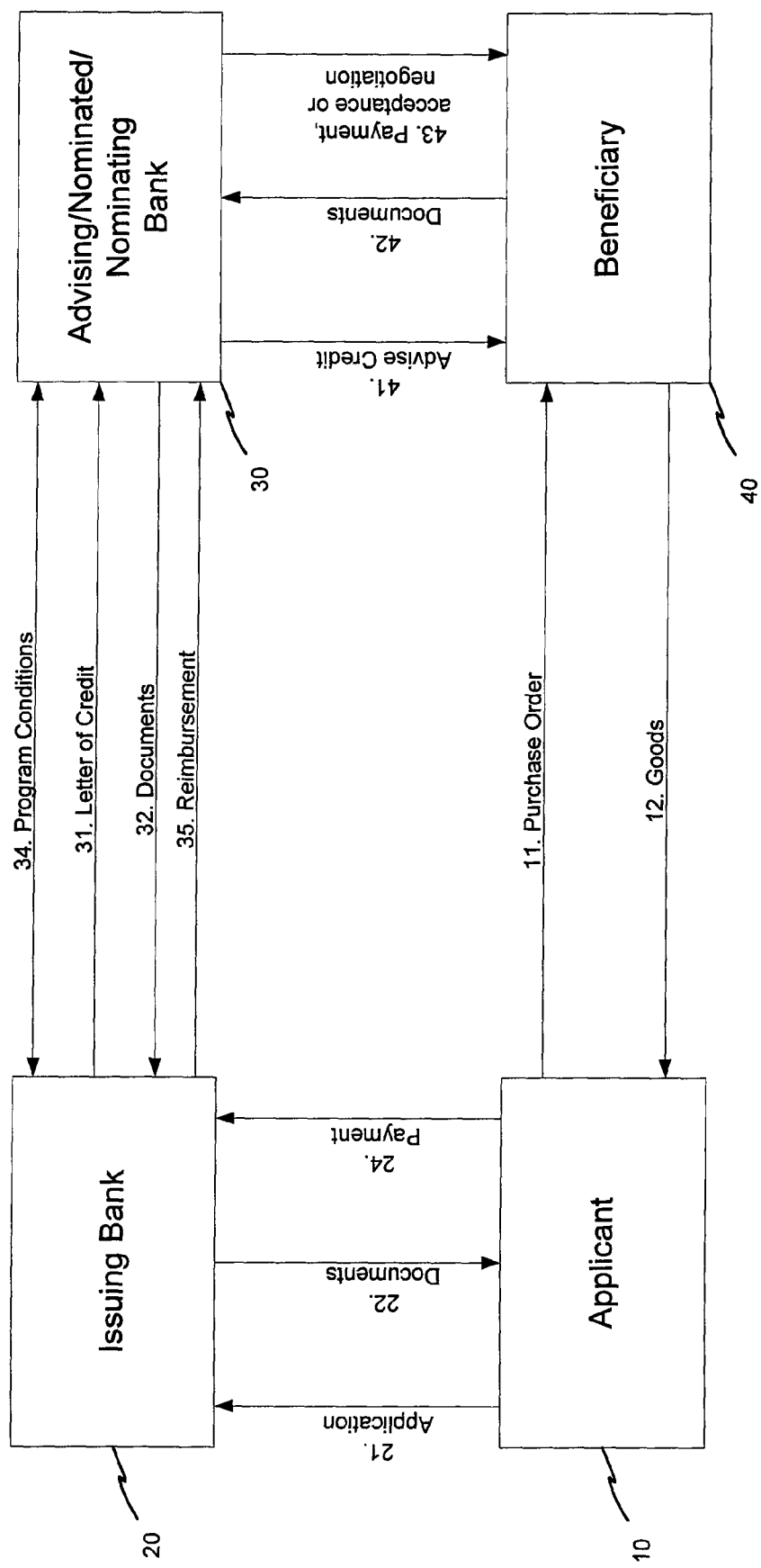
FIG. 2 is a block diagram illustrating exemplary flows in a representative transaction utilizing a Credit for payment, where payment, acceptance, or negotiation of the Credit is facilitated according to one embodiment of the invention.

A representative transaction, as illustrated in FIG. 2, utilizes a Credit for payment, where payment, acceptance, or negotiation of the Credit is facilitated through a nominated bank according to one embodiment of the invention. The issuing bank 20 and the nominated bank 30 agree on conditions 34 governing a program under which the nominated bank 30 will examine documents 42 presented under a Credit 31 issued by the issuing bank 20, and pay, accept, or negotiate 43 the Credit 31 based on the nominated bank's 30 own examination of the documents 42 with no or minimal recourse to the issuing bank 20 on any discrepancies and before said documents 42 are forwarded 32 to, received or accepted by, the issuing bank 20. Such program conditions 34 might include, for example, conditions for eligibility of Credits for the program, including any individual or aggregate maximum or minimum amount applicable to Credits that may be outstanding at any given time, procedures and standards for the handling and examination of documents, procedures for discrepant documents, time periods within which discrepant documents must be noticed to the nominated bank, procedures for the resolution of disputes concerning discrepant documents, terms and conditions applicable to no recourse and/or limited recourse payment, acceptance, or negotiation, procedures for reimbursement, pre-debit advises, applicable legal requirements, and other programmatic and legal terms.

Documents may be tangible or in electronic form, generated by any of various systems and procedures now or hereafter in use by manufacturers, sellers, exporters, shippers, freight forwarders, and the like. In certain embodiments, the standard for the examination of documents may be as stipulated under UCP, Article 13, as interpreted in various ICC position papers and opinions, or as outlined by the International Financial Services Association's (IFSA) Standard Banking Practice (which sources are hereby incorporated by reference), all of which are hereby incorporated by reference. The standards may also be in accordance with any future generally accepted examination procedures adopted by the ICC. In some embodiments, these examination standards may be replaced or supplemented as the issuing bank and the nominated bank may agree. In certain embodiments, the UCP, ICC position papers and opinions, and/or publications of the IFSA may be the basis of settlement of any disputes regarding the validity of discrepancies.

The program conditions are part of the contractual undertakings between the issuing bank and the nominated bank, and under the independence principle are separate and distinct from undertakings between the issuing bank and the other participants or between the nominated bank and the other participants. The other participants are not parties to the program conditions, the nominated bank incurs no obligations or liabilities to the other participants by reason of the program conditions, and the other participants are neither entitled to rely upon nor enforce the program conditions.

Embodiments of the invention extend to all types of Credits, including revocable, irrevocable, sight, and deferred payment Credits. In certain embodiments, the Credit may be restricted for negotiation to the nominated bank, and/or allow the nominated bank to confirm the Credit. In one embodiment of the invention, the issuing bank has an account with the nominated bank which the nominated bank may debit for reimbursement. In another embodiment, the nominated bank establishes claims on the issuing bank for reimbursement by, for example, tested telex or SWIFT.

Referring to FIG. 2, the issuing bank 20 issues a Credit 31 upon acceptance of an application 21 from an applicant 10. In some embodiments, the nominated bank 30 advises 41 the Credit 31 to the beneficiary 40, and where payment, acceptance, or negotiation 43 is restricted to the nominated bank 30, documents 42 are presented to the nominated bank 30. The nominated bank 30 examines the documents 42 under the program conditions 34, and pays, accepts, or negotiates 43 said Credit 31 based on its own examination of the documents 42 with no or minimal recourse to the issuing bank 20 on any subsequent discrepancies and before said documents 42 are forwarded 32 to, received or accepted by, the issuing bank 20. The nominated bank 40 forwards 32 the documents 42 to the issuing bank 20, and the issuing bank 20 forwards 22 the documents 42 to the applicant 10, with or without examination for conformity to stipulated documents, obtains payment 24 from the applicant 10, and reimburses 35 the nominated bank 30. Where discrepancies in the documents 42 are found by the nominated bank 30, the nominated bank 30 seeks waivers or instructions from the issuing bank 20 as provided in the program conditions 34. Where discrepancies in the documents 42 are noticed by the issuing bank 20 or the applicant 10 within any time period specified in the program conditions 34, the nominated bank 30 has no or limited recourse to the issuing bank 20 for reimbursement 35 as provided in the program conditions 34, and must resolve the discrepancies with the beneficiary 40.

Figure 3:
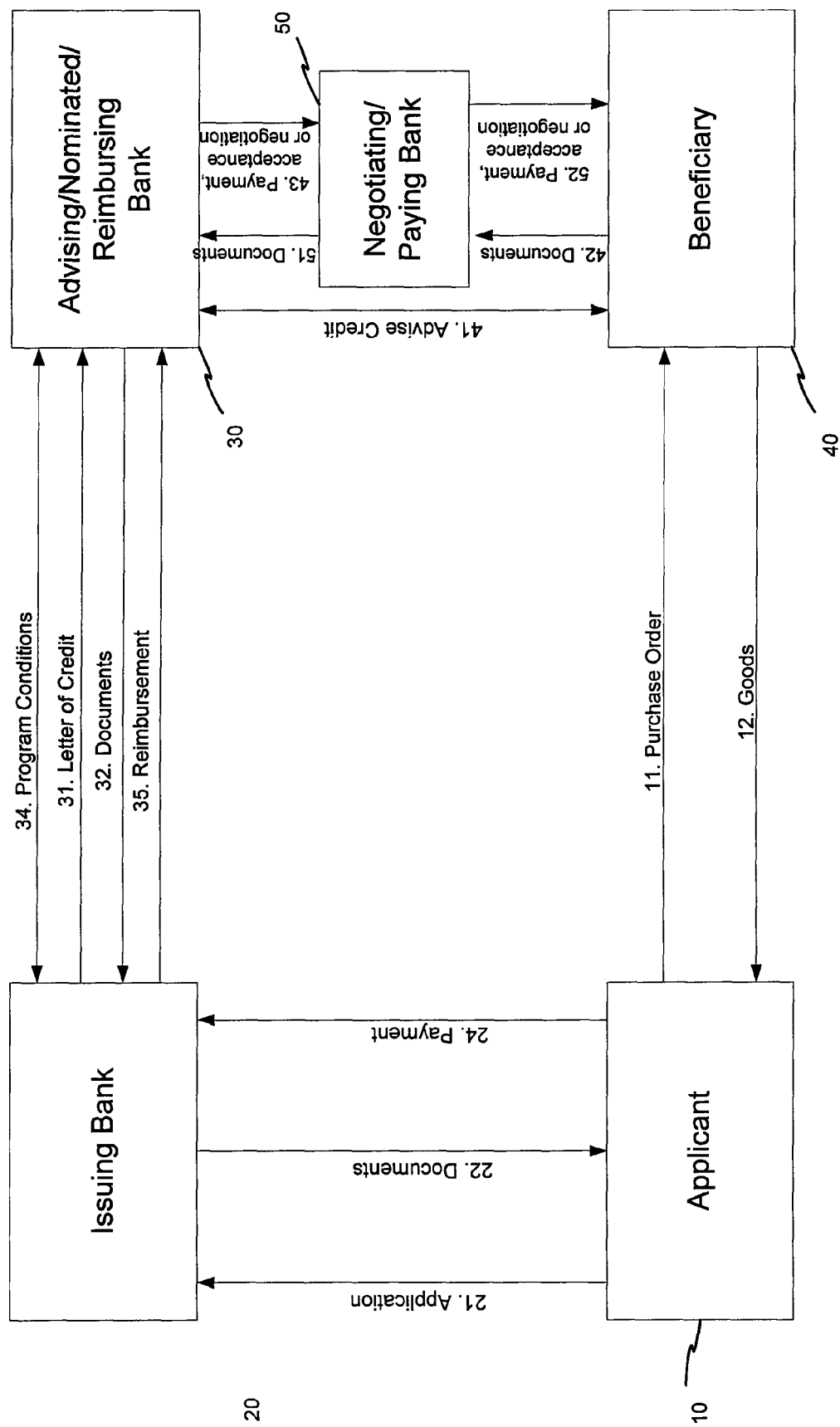
FIG. 3 is a block diagram illustrating exemplary flows in a representative transaction, where payment, acceptance, or negotiation of the Credit is facilitated according to another embodiment of the invention.

In embodiments contemplating a freely negotiable Credit, as illustrated in FIG. 3, payment, acceptance, or negotiation 43 of the Credit 31 is not restricted to one nominated bank 30, and documents 42 may be presented to any bank 50. In such circumstance, the issuing bank 20 may designate the pertinent nominated bank 30 as a reimbursing bank. Upon receipt of documents 42 from the negotiating/paying bank 50, the nominated/reimbursing bank 30 examines the documents 42 under the program conditions 34, and undertakes to reimburse 43 the negotiating/paying bank 50 for the payment, acceptance, or negotiation 52 of said Credit 31 based on the nominated/reimbursing bank's 40 own examination of the documents 42 with no or minimal recourse to the issuing bank 30 on any subsequent discrepancies and before said documents are forwarded 32 to, received or accepted by, the issuing bank.

Figure 4:
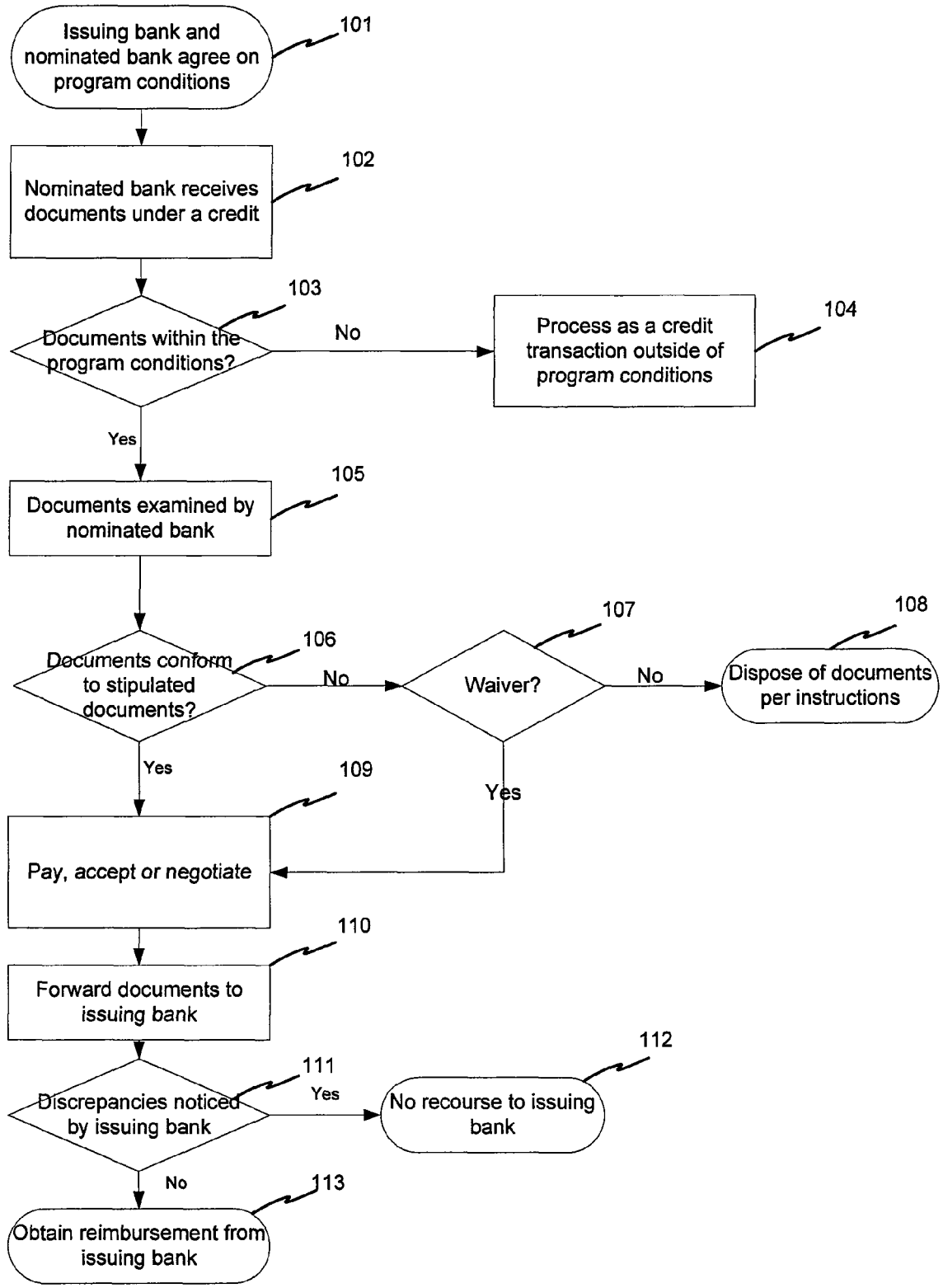
FIG. 4 is a flow diagram of an exemplary method for the application of program conditions to facilitate a representative transaction utilizing a Credit for payment.

FIG. 4 is a flow diagram of an exemplary method for the application of program conditions to facilitate a representative transaction utilizing a Credit for payment. The issuing bank and the nominated bank agree or substantially agree on program conditions. (step 101) Upon receipt of documents presented under a Credit (step 102), the nominated bank first confirms that the Credit is covered or substantially covered by the program conditions. (step 103) Where the Credit is not so covered, the nominated bank receives, examines, and forwards the documents to the issuing bank in accordance with applicable law and banking standards and without regard to the program conditions. (step 104) Where the Credit is covered or substantially covered by the program conditions, the nominated bank receives and examines the documents (step 105) for conformity to the stipulated documents. (step 106) Where the documents are determined to be conforming, based on such examination, and as provided in the program conditions, the nominated bank pays, accepts, or negotiates the Credit. (step 109) Where the documents are determined to be discrepant, the nominated bank refuses to pay, accept, or negotiate the Credit. In one embodiment, where the program conditions so provide, the nominated bank seeks a waiver of the discrepancy from the issuing bank. (step 107) Where such waiver is obtained, the waiver is deemed an exception to or modification of the program conditions, and the nominated bank pays, accepts, or negotiates the Credit as provided in the program conditions, with no or limited recourse against the issuing bank for other discrepancies in the documents. (step 109) Where such waiver is not obtained, the nominated bank disposes of the documents in accordance with the program conditions or instructions received.

The nominated bank forwards the documents to the issuing bank. (step 110) Where the issuing bank determines that the documents are discrepant, (step 111) it must notice such discrepancies to the nominated bank. The issuing bank may have a predetermined number of business days (e.g., seven) from the date of receipt of documents to revert to the nominated bank with any document discrepancies, otherwise, the issuing bank may not invoke the no or limited recourse provisions of the program conditions to dispute a claim for reimbursement by the nominated bank. Where no deficiencies are noticed within the period specified in the program conditions, the nominated bank's claim for reimbursement is indisputable. (step 113). However designated herein, participants in transactions utilizing a Credit for payment include any person, entity, hardware or software. References to any "bank" includes all types of banks and other financial institutions, as well as any other persons or entities that under applicable law or custom may fulfill the particular role and make and perform the requisite undertakings contemplated by embodiments of the invention. There may be other participants involved in some phases of the transaction, such as intermediary banks, but such participants are not shown. The documents may include documents in physical, electronic or any other form or media.

Communication among the participants and/or any system components, and the exchange of documents and data, in accordance with embodiments of the invention may be accomplished through any suitable delivery system, such as, for example, hand delivery, mail and courier services, and through any suitable communication system, such as, for example, a telephone network, the Internet, an intranet, an extranet, a local area network (LAN), a wide area network (WAN), wireless communications, satellite communications, and/or the like. Participants may interact with the communication system via any suitable input, output and/or viewing device, such as, for example, telephone, cellular phone, fax, telex, computer terminal, workstation, personal digital assistant, handheld computer, and/or the like. Such devices may run any operating system, such as any version of Windows®, MacOS, OS/2, BeOS, Linux, UNIX, Solaris, or the like. The communications system may be implemented with any communications protocol, such as TCP/IP, IPX, Appletalk, IP-6, NetBIOS, OSI, or any number of existing or future protocols.

In certain embodiments, communications may not be secure or encrypted. In other embodiments, communications may be secure and/or encrypted. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography" by Jonathan Knudson, published by O'Reilly & Associates (1998); (3) "Cryptography & Network Security: Principles & Practice" by William Stalling, published by Prentice Hall; all of which are hereby incorporated by reference.

Payment or reimbursement may be effected by any means, including check, draft, acceptance, remittance, or by electronic means utilizing any payment or remittance network or service.

As will be appreciated by one of ordinary skill in the art, embodiments of the invention may take the form wholly or in part of a data processing system, a device for data processing, and/or a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

Benefits, advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

We claim:

1. A computer-implemented method for facilitating the negotiation of a letter of credit, the method comprising:

receiving, at a nominated bank computer associated with said nominated bank, a document presented under a letter of credit for at least one of payment, acceptance, or negotiation, wherein said letter of credit is issued by an issuing bank computer associated with an issuing bank, in favor of a beneficiary and wherein said beneficiary is advised of said letter of credit by said nominated bank computer associated with said nominated bank;

wherein said nominated bank and said issuing bank have agreed to program conditions pursuant to which said nominated bank, in response to examination of said document by said nominated bank and before said document is forwarded to, received, and accepted by said issuing bank, at least one of pays, accepts or negotiates said credit with limited recourse to said issuing bank for discrepancies in said document; and examining said document, by said nominated bank, for conformity to stipulated documents specified in said letter of credit and conformity to said program conditions; and, in response to said document being in conformity with said stipulated documents and said program conditions, at least one of paying, accepting, or negotiating said letter of credit, by said nominated bank computer; with limited recourse to said issuing bank for discrepancies in said document.

2. The method of claim 1, wherein said letter of credit is restricted for negotiation to an office maintained by said nominated bank.

3. The method of claim 1, wherein said letter of credit is not restricted for negotiation to an office maintained by said nominated bank, and wherein said nominated bank is designated as a reimbursing bank, and wherein said document is received at an intermediary bank computer associated with said intermediary bank and forwarded, by said intermediary bank computer to said nominated bank, for at least one of examination, payment, acceptance, or negotiation.

4. The method of claim 1, wherein said nominating bank confirms said letter of credit.

5. The method of claim 1, wherein, in response to discrepancies existing in said document, requesting a waiver of said discrepancies from said issuing bank as provided in said program conditions.

6. The method of claim 5, wherein, in response to said waiver being obtained, said nominated bank at least one of paying, accepting, or negotiating said letter of credit with limited recourse to said issuing bank for other discrepancies in said document.

7. The method of claim 5, wherein, in response to said waiver not being obtained, said nominated bank disposing of said document as provided in said program conditions without at least one of payment, acceptance, or negotiation.

8. A computer program product for facilitating the negotiation of a letter of credit, said computer program product comprising:

computer readable program code means embodied in said medium for receiving, at a nominated bank computer associated with said nominated bank, a document presented under a letter of credit for at least one of payment, acceptance, or negotiation, wherein said letter of credit is issued by an issuing bank computer associated with an issuing bank, in favor of a beneficiary and wherein said beneficiary is advised of said letter of credit by said nominated bank computer associated with said nominated bank;

wherein said nominated bank and said issuing bank have agreed to program conditions pursuant to which said nominated bank, in response to examination of said document by said nominated bank and before said document is forwarded to, received, and accepted by said issuing bank, at least one of pays, accepts or negotiates said credit with limited recourse to said issuing bank for discrepancies in said document; and computer readable program code means embodied in said medium for examining said document, by said nominated bank, for conformity to stipulated documents specified in said letter of credit and conformity to said program conditions; and, in response to said document being in conformity with said stipulated documents and said program conditions, computer readable program code means embodied in said medium for at least one of paying, accepting, or negotiating said letter of credit, by said nominated bank computer, with limited recourse to said issuing bank for discrepancies in said document.

9. A computer-implemented method for facilitating the negotiation of a letter of credit by an issuing bank, the method comprising:

issuing a letter of credit, by an issuing bank computer associated with an issuing bank, in favor of a beneficiary, wherein said letter of credit is advised to said beneficiary by a nominated bank computer associated with a nominated bank, and a document is presented under said letter of credit for at least one of payment, acceptance, or negotiation at said nominated bank computer associated with a nominated bank; and agreeing to program conditions, by said issuing bank with said nominated bank, wherein said nominated bank, in response to said nominated bank examination of said document and before said document is forwarded to, received, or accepted by said issuing bank, at least one of pays, accepts or negotiates said letter of credit with limited recourse to said issuing bank for discrepancies in said document, wherein said document is examined by said nominated bank computer for conformity to stipulated documents specified in said letter of credit;

wherein, in response to said document being determined to be in conformity with said stipulated documents and said program conditions, said letter of credit being at least one of paid, accepted, or negotiated by said nominated bank with limited recourse to said issuing bank for discrepancies in said document.

10. The method of claim 9, wherein said letter of credit is restricted for negotiation to an office maintained by said nominated bank.

11. The method of claim 9, wherein said letter of credit is not restricted for negotiation to an office maintained by said nominated bank, and wherein said nominated bank is designated as a reimbursing bank, and wherein said document is received at an intermediary bank computer associated with said intermediary bank and forwarded, by said intermediary bank computer to said nominated bank, for at least one of examination, payment, acceptance, or negotiation.

12. The method of claim 9, wherein said nominating bank confirms said letter of credit.

13. The method of claim 9, wherein, in response to discrepancies existing in said document, said nominated bank requests a waiver of said discrepancies from said issuing bank as provided in said program conditions.

14. The method of claim 13, wherein, in response to said waiver being obtained, said nominated bank at least one of pays, accepts, or negotiates said letter of credit with limited recourse to said issuing bank for other discrepancies in said document.

15. The method of claim 13, wherein, in response to said waiver not being obtained, said nominated bank disposes of said document as provided in said program conditions without at least one of payment, acceptance, or negotiation.

* * * * *